US009363104B2

(12) United States Patent
Noble et al.

(10) Patent No.: US 9,363,104 B2
(45) Date of Patent: *Jun. 7, 2016

(54) CUSTOMIZED SPEECH GENERATION

(71) Applicant: Amazon Technologies, Inc., Reno, NV (US)

(72) Inventors: Isaac Scott Noble, Soquel, CA (US); Gabrielle M. Halberg, Santa Cruz, CA (US); Kenneth Mark Karakotsios, San Jose, CA (US); Yuzo Watanabe, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/257,922

(22) Filed: Apr. 21, 2014

(65) Prior Publication Data

US 2014/0229182 A1  Aug. 14, 2014

Related U.S. Application Data

(63) Continuation of application No. 13/529,788, filed on Jun. 21, 2012, now Pat. No. 8,706,827.

(51) Int. Cl.
*G06F 15/16* (2006.01)
*H04L 12/58* (2006.01)
*G10L 13/027* (2013.01)
*G06F 17/27* (2006.01)
(Continued)

(52) U.S. Cl.
CPC ............... *H04L 12/58* (2013.01); *G06F 17/27* (2013.01); *G06F 17/2881* (2013.01); *G10L 13/027* (2013.01); *G10L 15/18* (2013.01); *H04L 12/5805* (2013.01); *H04M 1/64* (2013.01); *H04M 1/72547* (2013.01); *H04M 2250/10* (2013.01)

(58) Field of Classification Search
CPC ............................ H04L 12/58; H04L 12/5805
USPC ................................ 709/206–207; 704/9, 270
See application file for complete search history.

(56) References Cited

U.S. PATENT DOCUMENTS 6,640,230 B1  10/2003  Alexander et al.
7,567,662 B1   7/2009  Renner et al.
(Continued)

OTHER PUBLICATIONS

"Non-Final Office Action dated Mar. 19, 2013," U.S. Appl. No. 13/529,788, filed Jun. 21, 2012, 20 pages.
(Continued)

*Primary Examiner* — Shaun Roberts
(74) *Attorney, Agent, or Firm* — Polsinelli LLP

(57) ABSTRACT

Various approaches enable automatic communication generation based on patterned behavior in a particular context. For example, a computing device can monitor behavior of a user to determine patterns of communication behavior in certain situations. In response to detecting multiple occurrences of the certain situation, a computing device can prompt a user to perform an action corresponding to the pattern of behavior. In some embodiments, a set of speech models corresponding to a type of contact is generated. The speech models include language consistent with patterns of speech between a user and the type of contact. Based on context and on the contact, a message using language consistent with past communications between the user and contact is generated from a speech model associated with the type of contact.

20 Claims, 7 Drawing Sheets

(51) Int. Cl.
    *G06F 17/28*     (2006.01)
    *G10L 15/18*     (2013.01)
    *H04M 1/725*     (2006.01)
    *H04M 1/64*     (2006.01)

(56) References Cited

U.S. PATENT DOCUMENTS

| | | |
|---|---|---|
| 7,631,042 B2 | 12/2009 | Chen et al. |
| 7,720,681 B2 | 5/2010 | Milstein et al. |
| 8,060,565 B1 | 11/2011 | Swartz |
| 8,375,320 B2 | 2/2013 | Kotler et al. |
| 2006/0119583 A1 | 6/2006 | Potera |
| 2007/0032225 A1 | 2/2007 | Konicek et al. |
| 2007/0260694 A1 | 11/2007 | Boss et al. |
| 2008/0070604 A1 | 3/2008 | Castagnet |
| 2009/0164578 A1 | 6/2009 | Demsky et al. |
| 2010/0036928 A1 | 2/2010 | Granito et al. |
| 2010/0241663 A1 | 9/2010 | Huang et al. |
| 2012/0198005 A1 | 8/2012 | Deluca |

OTHER PUBLICATIONS

"Final Office Action dated Aug. 27, 2013," U.S. Appl. No. 13/529,788, filed Jun. 21, 2012, 19 pages.

"Notice of Allowance dated Nov. 27, 2013," U.S. Appl. No. 13/529,788, filed Jun. 21, 2012, 13 pages.

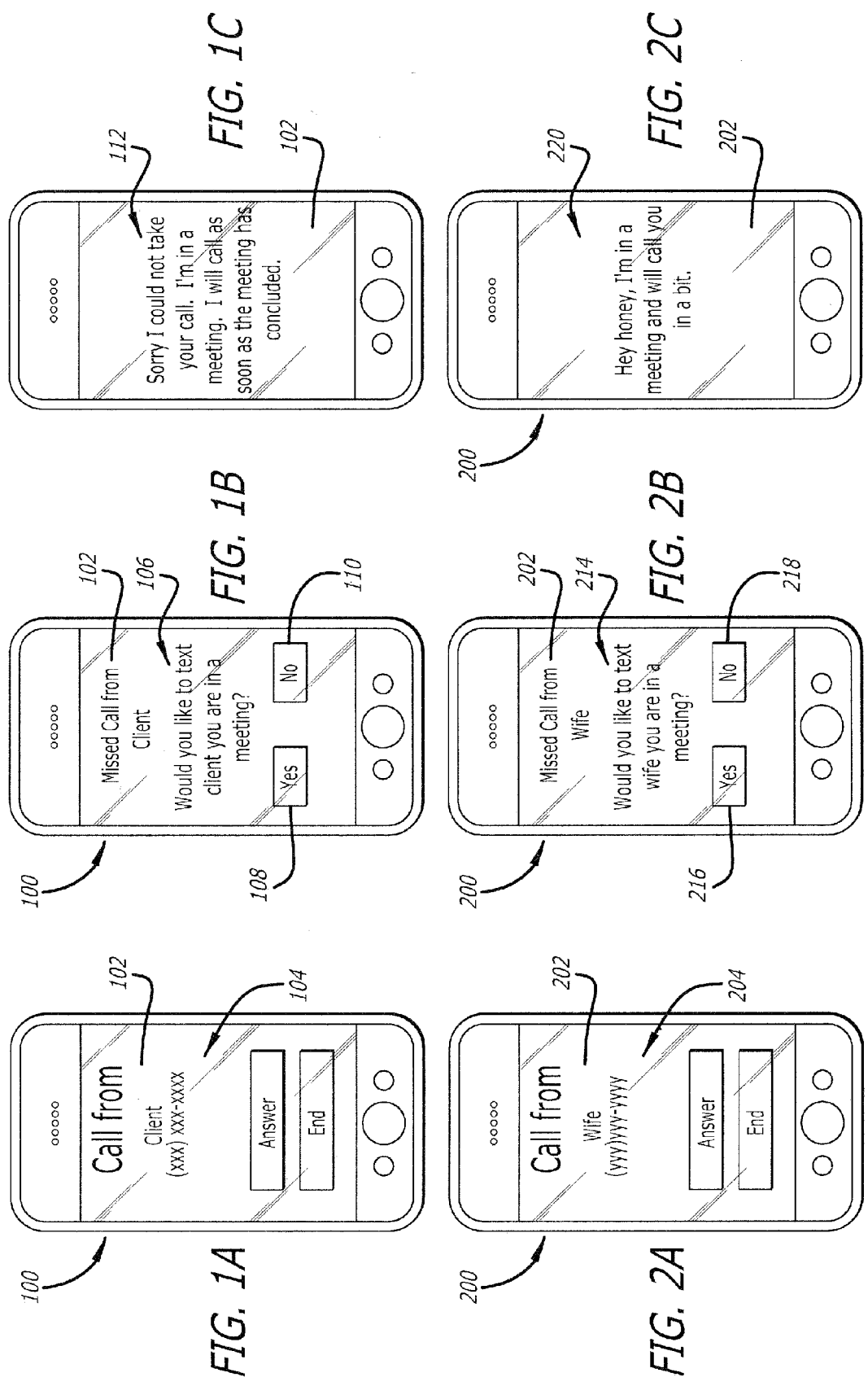

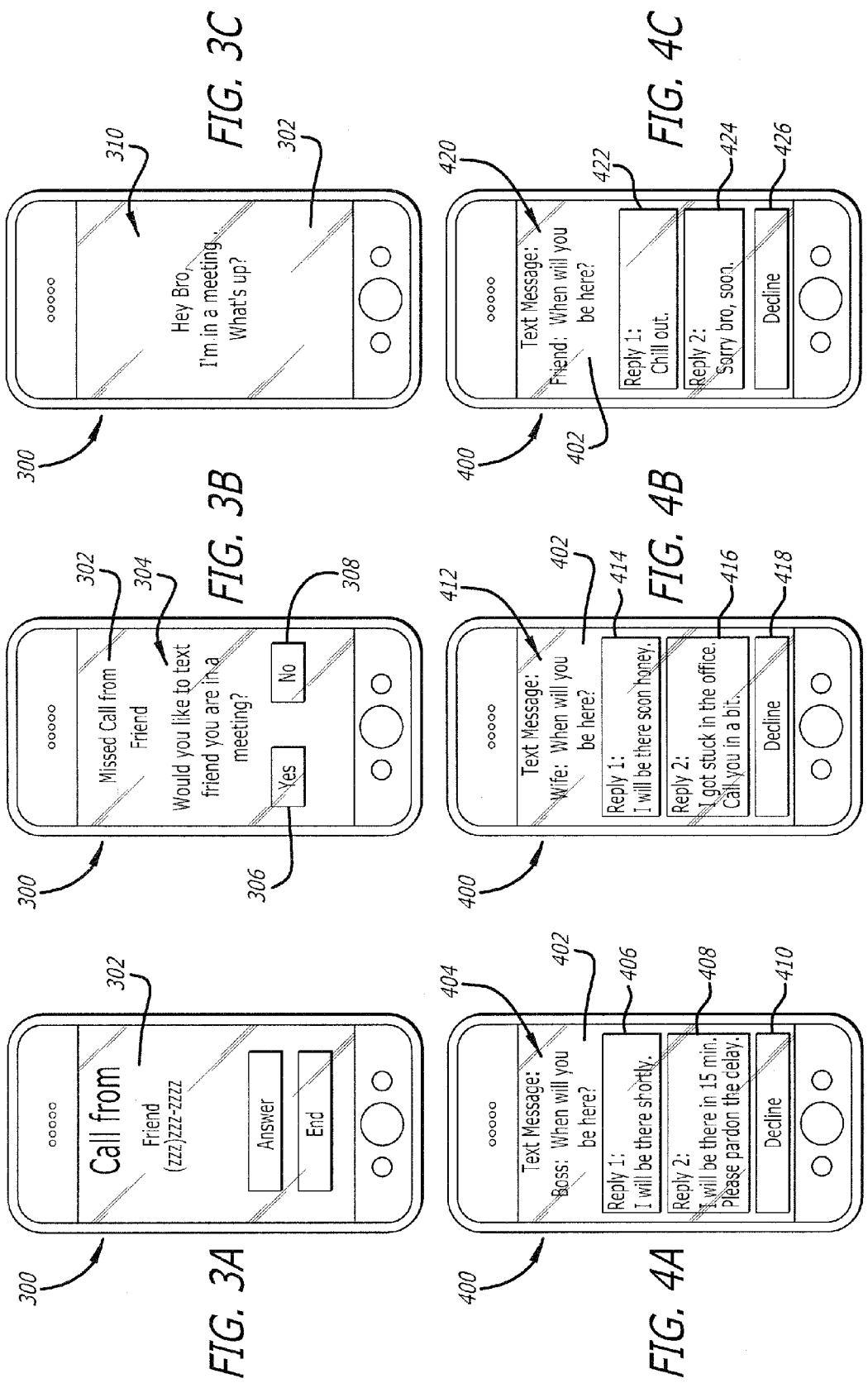

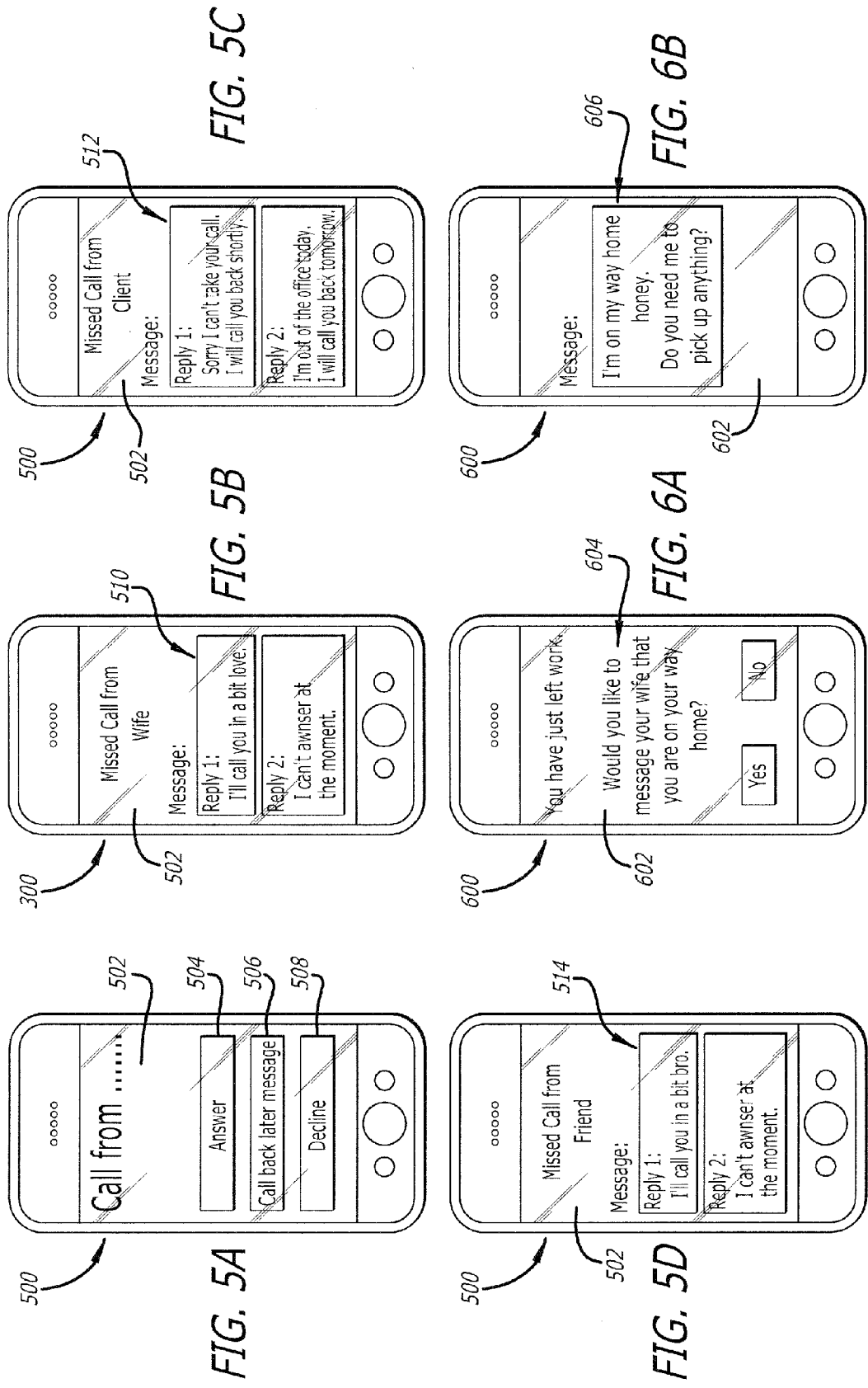

CUSTOMIZED SPEECH GENERATION

CROSS-REFERENCE TO RELATED APPLICATIONS

This is a continuation application of parent U.S. patent application Ser. No. 13/529,788, filed on Jun. 21, 2012, entitled "CUSTOMIZED SPEECH GENERATION," which is hereby incorporated herein by reference in its entirety.

BACKGROUND

Many people are increasingly relying upon portable devices to store, track, and update various types of information and handle various types of tasks. As devices become ever more intelligent, and offer additional types of functionality, it becomes increasingly undesirable to continue to have to access different applications and repeatedly manually enter similar types of information. Further, device users often communicate with different types of people in different ways. It generally is up to a user to ensure that a communication uses the proper tone, terminology, and phrasing for the type of recipient.

BRIEF DESCRIPTION OF THE DRAWINGS

Various embodiments in accordance with the present disclosure will be described with reference to the drawings, in which:

FIGS. 1A, 1B, and 1C illustrate an example communication suggestion that can be presented to a user in accordance with various embodiments;

FIGS. 2A, 2B, and 2C illustrate another example communication suggestion that can be presented to a user in accordance with various embodiments;

FIGS. 3A, 3B, and 3C illustrate another example communication suggestion that can be presented to a user in accordance with various embodiments;

FIGS. 4A, 4B, and 4C illustrate example communication suggestions that can be presented to a user in accordance with various embodiments;

FIGS. 5A, 5B, 5C, and 5D illustrate example communication suggestions that can be presented to a user in accordance with various embodiments;

FIGS. 6A and 6B illustrate an example communication suggestion that can be presented to a user in accordance with various embodiments;

DETAILED DESCRIPTION

Figure 7:
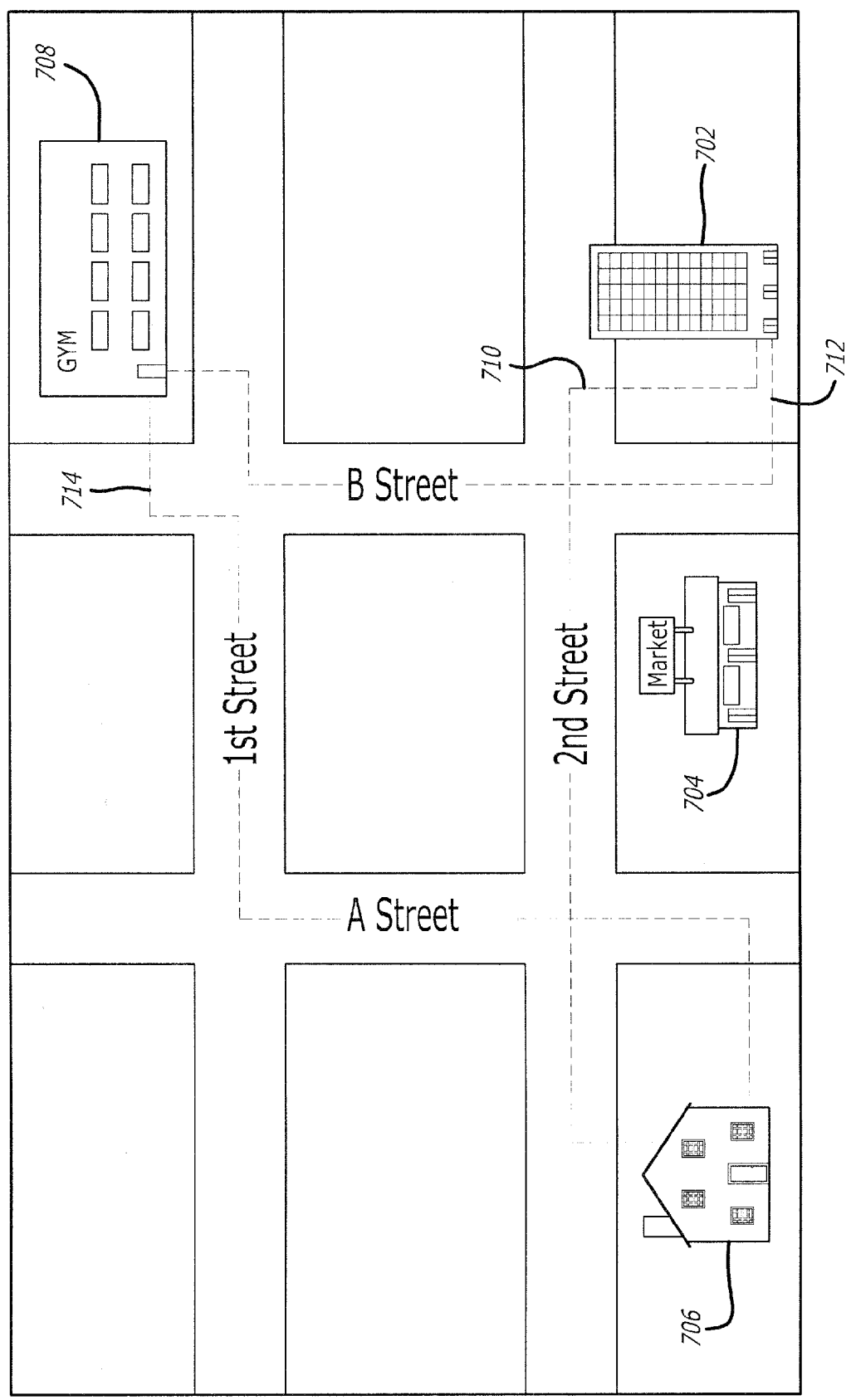
FIG. 7 illustrates an example situation wherein position information is used to generate a communication in accordance with at least one embodiment.

Systems and methods in accordance with various embodiments of the present disclosure may overcome one or more of the aforementioned and other deficiencies experienced in conventional approaches to managing communications in an electronic environment. In particular, various embodiments enable communication generation on behalf of a user based at least in part on patterned behavior learned for the user in various contexts. For example, a computing device can monitor user behavior to determine patterns of communication behavior in various situations. After detecting or identifying multiple occurrences of a type of communication in a particular situation, the computing device can attempt to define a pattern of behavior or the user in that type of situation. When the computing device is subsequently in that type of situation again, the computing device can prompt a user to perform an action corresponding to the pattern of behavior. For example, if a user makes a call or sends a text each weekday when within a given distance of a geographical location, such as within a mile from a workplace, the device can prompt the user whether the device should initiate that call or text the next time the computing device is in that location.

In some embodiments, software executing on a computing device can also attempt to monitor patterns of speech used by the user in various contexts or situations. Certain embodiments can generate a set of speech models, where each speech model corresponds to a type of recipient. Each speech model can include language that is consistent with patterns of speech typically used between a user and a recipient or a type of recipient. For example, a user might use different words and phrasing when communicating with a relative than when communicating with a co-worker. Based at least in part upon the context and/or recipient of a communication, a communication might be automatically generated that uses language for an appropriate pattern of speech, where that pattern of speech is consistent with past communications between the user and the type of recipient.

Various types of information can be used to develop patterns of speech for certain types of recipients and/or contexts. For example, at least some embodiments can utilize various social networking and communication information to generate, and train or refine, different patterns of speech. The embodiments can also use various social, communication, and/or behavior information to determine when communications are sent and/or the context in which those communications are sent. The communications might involve speech, text, or other such information. At least some embodiments then can automatically create at least somewhat personalized messages to be sent to various recipients, where those messages are triggered by particular circumstances. When a speech communication is generated, a speech engine can utilize past interactions on social networks, email, text messages, and voice communications to build communication profiles of both how a user communicates to various contacts and how the contacts respond to the user through various means of communication. These past communications can be used to seed the speech engine in order to generate subsequent messages that are natural and tailored to how the user actually speaks to different people or contact groups. In various embodiments, the messages are customized based on separating contacts with similar characteristics into various contact groups, such as business, friend, or family, for example, to enable contextualized interactions.

The ability to automatically generate communications according to various patterns of speech, or speech profiles, for various recipients and/or contexts can provide various advantages over conventional communication approaches. For example, a speech engine discussed herein can automatically generate a speech communication without the user having to verbally dictate or record a message. When generating an email or text message to a contact labeled as a business contact, a speech engine might use a business contact speech profile built partly by mining data from past business communications. When generating an email or text message to a contact labeled as a friend, on the other hand, the speech engine might use a friend speech profile, or speech profile particular to that specific friend. The language contained in the business speech profile would likely be more conservative and professional as compared to the language contained in the friend speech profile. For example, a speech engine discussed herein might use language examples from business emails to generate an email for a work meeting invite and, conversely, the speech engine might use language examples from a user's social feeds when setting up a party for a friend.

Various other applications, processes and uses are presented below with respect to the various embodiments.

FIGS. 1A, 1B, and 1C illustrate an example communication suggestion sequence that can be presented on a display 102 of a computing device 100, such as a smartphone or tablet computer. In this example, a communication 104 is received, which in this case relates to a phone call from a client. The client device can utilize contact information or other appropriate data to determine that the call is from a client or business type of user. If the client is unable to answer the call, such as when the client is in a meeting, the device 100 can generate a prompt 106 for the user on a display screen 102, as illustrated in FIG. 1B, asking whether the user wants to text the user that the user will return the caller's call at a later time. The device can determine, using the user's calendar, location, and/or other such information, that the user is in a meeting. Based at least in part upon the context (e.g., in a meeting) and the type of recipient or type of contact (e.g., a client or business contact), the device 100 can ask the user whether the user wants to send a text to that client that the user is in a meeting and will call back later. As discussed, a speech model for client or business contacts can have been generated based on past communications between a user and one or more people labeled as, for example, business contacts. The communications could have involved phone calls, video chats, text messages, email messages, and the like. In this example, the user can select not 110 to send a text message in response to the missed call or the user can select yes 108 to send a message. Based on the appropriate speech model for a business type of recipient, a message 112 can be generated, shown in FIG. 1C. The message can then be automatically sent to the client. As illustrated, the message is generated using language or wording that is appropriate for a business contact, as determined using a business contact speech model or other such profile. In this example, the recipient can feel as if the recipient received a personalized message, which reads, "Sorry I couldn't take your call. I am in a meeting and will call as soon as the meeting has concluded," even though the user only pressed a single button or selected a single option.

In various embodiments, a speech or communication model can be generated for any group of people or for an individual. FIGS. 2A, 2B, and 2C illustrate an example communication suggestion presented on a display 202 of a computing device 200. In this example, the user is once again in a meeting and receiving a call 204, in this case, from his wife, as shown in FIG. 2A. Based on past communications, a communication model can be generated that using information about the way a user communicates with a particular contact or group of contacts. The communication models can be derived from patterns of speech or word usage, such as particular word or phrases, typically used when the user communicates with a particular contact. In this example, a communication model is, or has been, generated from dialog patterns or patterns of speech typically used when the user communicates with his wife. As in the previous example, the computing device is aware that the user is in a meeting by mining or accessing the user's calendar application and, in response, generates a text message reply to his wife taking the context of the meeting into account. Thus, in FIG. 2B, the computing device 200 prompts the user with a question 206 to ask whether the user "would you like to text Wife you are in a meeting?" In this example, the user can select no 210 in response to the missed call or the user can select yes 208 to send the message 212, shown in FIG. 2C, to his wife using dialog or wording from the communication model stored for his wife that reads "Hey Honey, I'm in a meeting and will call you in a bit."

FIGS. 3A, 3B, and 3C illustrate an example communication suggestion on a display 302 of a computing device 300, in accordance with one embodiment. This example illustrates another example of how a computing device can generate new speech and customize responses to different people while the user is in a meeting or another such context. In this example, the user is receiving a call 304 from a friend, as shown in FIG. 3A. Based on past communications between the user and his friend, a speech profile can have been generated that is derived from patterns of speech or word usage typically used when the user communicates with his friend or a larger group of friends. As in the previous two examples, the computing device is aware that the user is in a meeting and in response, generates a text message reply to his friend that takes the fact that the user is in a meeting into account. Thus, in FIG. 3B, the computing device 300 prompts the user with a question 306 to ask whether the user "would you like to text Friend you are in a meeting?" Once again, the user can select no 310 in response to the missed call or the user can select yes 308 to send the message 312, shown in FIG. 3C, to his Friend using language or wording from the speech profile stored for his friend or friend category that reads "Hey Bro, what's up?"

In some embodiments, the user can have some amount of control over the type of message that is to be sent. For example, as illustrated in FIGS. 4A, 4B, and 4C, the device can generate different potential messages to be sent for a particular context and/or recipient. In this example, the initial communication is the same but the recipients are different types of contacts. For each type of contact, the device can generate two (or another appropriate number of) potential messages that can be sent via speech, text, or other such communication methods. The different messages are illustrated on the display screen 402 of an example computing device 400. FIG. 4A illustrates an example situation where a user receives a text message 404 from his Boss asking the user when he will arrive ("When will you be here?"). Since the user's Boss is a business contact, a formal or professional type of response is generated, according to an appropriate speech model, based at least in part on the formality of the relationship and/or professional dialog used in past communications. As illustrated in FIG. 4A, the computing device 400 generates two replies, the first response 406 stating "I will be there shortly," and the second response 408 stating "I will be there in 15 minutes, please pardon the delay." There is also a "decline" selection 410 in the event the user does not want to reply or does not deem a response appropriate. FIG. 4B illustrates two example responses (414, 416) to the same message 412 ("When will you be here?"), but from the user's wife in this case. In this example, the first response 414 states "I will be there soon honey," and the second response 416 states "I got stuck in the office. Call you in a bit." There is also a "decline" button 418. Likewise, FIG. 4C illustrates two example responses (422, 424) to the same message 420

("When will you be here?"), but, this time, from the user's friend. In this example, the first response 422 simply states "Chill out," and the second response 424 states "Sorry Bro, soon." There can also be a "decline" button 426 as in the last two examples.

FIGS. 5A, 5B, 5C and 5D illustrate three example generated response messages to receiving a phone call, in accordance with various embodiments. FIG. 5A shows a user receiving a phone call on a computing device 500. In this example, the computing device 500 includes an "answer" selection 504, a "Call back later message" selection 506, and a "decline" selection 508 and FIGS. 5B, 5C and 5D each illustrate an example generated "Call back later message" for callers from different contact groups. The user, in this example, can select the "answer" selection 504 to take the call, select the "Call back later message" selection 506 to have a message generated using a speech model of past communication patterns sent to the type of caller, or select the "decline" selection 508 to send the call to voicemail. FIG. 5B illustrates an example when the caller is the user's wife and the user could not or has chosen not to answer. In this example, the user has selected the "Call back later message" selection 506 and the message 510 that states "I'll call you in a bit love, I can't answer at the moment" is sent as a text message to his wife. FIG. 5C illustrates an example when the caller is a user's client and the user selected the "Call back later message" selection 506 to have the message 512 that states "Sorry I can't take your call, I will call you back shortly" is sent as a text message to the user's client. FIG. 5D illustrates an example when the caller is the user's friend and the user has selected the "Call back later message" selection 506 to have message 514 that states "Can't answer bro, I'll ring you in a bit" sent as a text message to the friend contact.

In various embodiments, a pattern of behavior for the specific context is generated in response to detecting multiple occurrences of a particular communication type in a particular context. A level of confidence to prompt a user to perform an action corresponding to the pattern of behavior is determined in response to subsequent detections of the particular context associated with the pattern and, if the level of confidence is greater than a predetermined threshold, the user is prompted by the computing device for an input to send a message corresponding to the pattern of behavior, in various embodiments.

FIGS. 6A and 6B illustrate an example situation of generating a message 606 corresponding to a pattern of behavior. In this example, a pattern of behavior is generated in response to detecting multiple occurrences of a user texting his wife upon leaving work for the evening, as may be based on location, time of the day, day of the week, and other such information. More particularly, upon registering a text message sent to a particular contact, in this example, the user's wife, multiple times at 6:00 pm on a weekday upon crossing a particular geographic point, for example, a pattern of behavior is generated and the contents of the text message are stored to a communication profile for the user's wife. In this example, the user's context is monitored by taking into account the time of day and the user's location using a positioning system based upon global positioning system (GPS) data, cellular signal or Wi-Fi triangulation, or any other appropriate mechanism. Thus, upon determining a match between a user's current context and a stored pattern of behavior within a reasonable margin of error or to a reasonable level of confidence, the user is prompted by the computing device 600 for an input to send a message corresponding to the pattern of behavior. In this example, the prompt 604 states "You have just left work, would you like to message your wife that you are on your way home?" In response to a positive input from the user, a message 606 is automatically generated using language and/or wording from previous messages sent under similar circumstances stored in the communication model for the user's wife. In this example, the message 606 states "I'm on my way home Honey. Need me to pick up anything?" The affectionate nickname "honey" used to refer to the user's wife being stored based on its usage in pervious messages as well as the question referring to picking "up anything" being based on the user habitually asking his wife if he should grab anything from the store on his way home, for example. Alternatively, the message 606 may not necessarily be automatically generated based on contextual queues, but be generated upon receiving an input from the user, such as a verbal input, for example. In one example, the user speaks to the computing device 600 through a conversational interface saying "Text wife" and the computing device 600, aware of the user's context through various sensors, generates the message 606.

In connection with the example discussed with respect to FIG. 6, FIG. 7 illustrates an example map 700 that can be used to track and/or infer user location, movement, destinations, and other such information to assist in determining a context for a communication in accordance with various embodiments. It should be understood that devices, applications, and services do not necessarily think in terms of maps, but may think in terms of positions, coordinates, routes, and/or other such information, and maps such as that in FIG. 7 may only be visual representations of a user's location. For purposes of explanation the description will refer to a selection of maps, but it should be understood that such renderings are used for purposes of explanation with respect to various aspects of the described embodiments.

In various embodiments, position and communication information for a user are monitored over time. One or more algorithms can be executed against the position and communication information in an attempt to recognize patterns or other repeating occurrences in the user's movement and/or position to assist in determining a context for various communications and communication patterns. For example, the map 700 of FIG. 7 illustrates a map of the streets near a user's home. There is an example route 710 illustrated on the map 700 that the user normally takes on his way home 706 during the week, a route 712 that the user often takes when going to the gym 708, and a route 714 the user takes home 706 from the gym 708. As discussed with respect to FIG. 6, the user regularly sends a text to his wife when he leaves work 702. In one example, the user sends his wife a text telling her he is going to the gym 708 instead of coming straight home 706 and the evenings he does not go to the gym 708, he texts her to ask whether she needs him to pick up anything at the supermarket 704. After detecting multiple occurrences of these communications in these specific contexts, a pattern of behavior is generated. For example, when the user leaves work 702 on route 712, the device can automatically generate a message to the user's wife notifying her that the user is going to the gym 708 based on the user's location/movement and time of day. Similarly, when the user leaves work 702 on route 710, the device can automatically generate a message to the user's wife asking her whether she would like him to pick up anything for dinner from the supermarket 704 based on the user's location/movement and time of day. A message notifying the user's wife that he is on the way home 706 from the gym 708 could also be generated based in part on the user traveling homeward along route 714.

Figure 8:
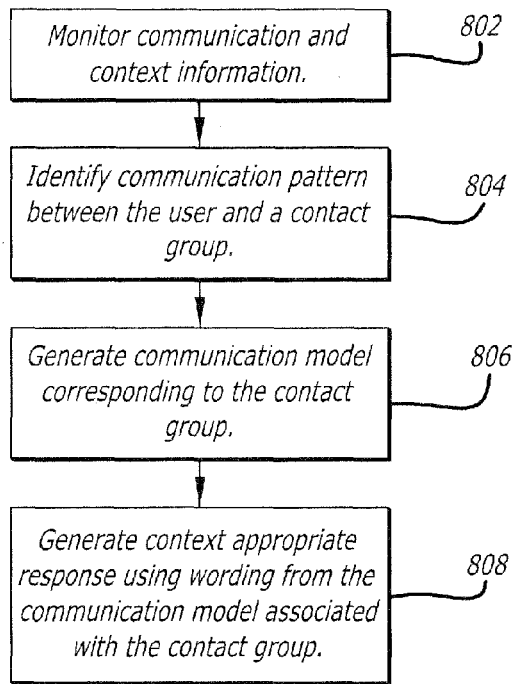
FIG. 8 illustrates an example process for generating a communication in accordance with at least one embodiment.

FIG. 8 illustrates an example process 800 for automatically generating a communication based on patterns of behavior, in accordance with various embodiments. It should be understood that, for any process discussed herein, there can be additional, fewer, or alternative steps performed in similar or alternative orders, or in parallel, within the scope of the various embodiments unless otherwise stated. In this example, communication and context information are monitored 802 and a communication pattern between the user and a contact group, or type of contact, is identified 804. The communication information can be monitored by mining textual information, such as a user's emails, social network feeds, text messages, and the like, and by analyzing voice data by extracting language content from the user's conversations. As mentioned, such information can be used to generate one or more speech patterns, speech profiles, speech models, etc. The context information can be monitored by taking various motion and positioning sensor data (i.e. GPS, accelerometer, gyroscope, and the like) into account along with the time of day or day of the week, for example, as well as by mining data from a calendar application, email, various task lists, and the like. The monitored communication and context information can reside locally and be stored on the computing device, or the information can be stored remotely in a profile management database, or a combination thereof, for example. As discussed above, the dialogs are customized by segmenting contacts into various contact groups, such as business, friend, or family, for example, to enable natural contextualized interactions. In this example, a communication model corresponding to the contact group is generated 806. Generating the communication models can include monitoring user communication behavior over time to adapt to changes or to compensate for variations in the behavior. Additionally, it would be advantageous to base the communication models specifically on past communications between the user and contacts from respective contact groups, such as messages generated by the user and messages received from contacts, because if communications generated by a speech engine are additionally used in developing the models, the system will be feeding back on itself and the generated messages will not be consistent with a user's communication patterns as time goes on. In this example, a context appropriate response is generated using wording or language from the communication model associated with the contact group 808. In this example, the user is prompted for an input to send the generated response 810. If the user does not want to send the response, the response is deleted 811. However, if the user wants to send the response, the user can provide an input, which can be a voice input provided to a conversational interface or a touch input provided to a touch display screen of the computing device, for example, to send the response to the recipient 812. In this example, a user may include a verbal instruction along with the voice input. For example, the user could say "warm response" to have a warmer response generated or say "formal response" to make the generated message more formal.

Figure 9:
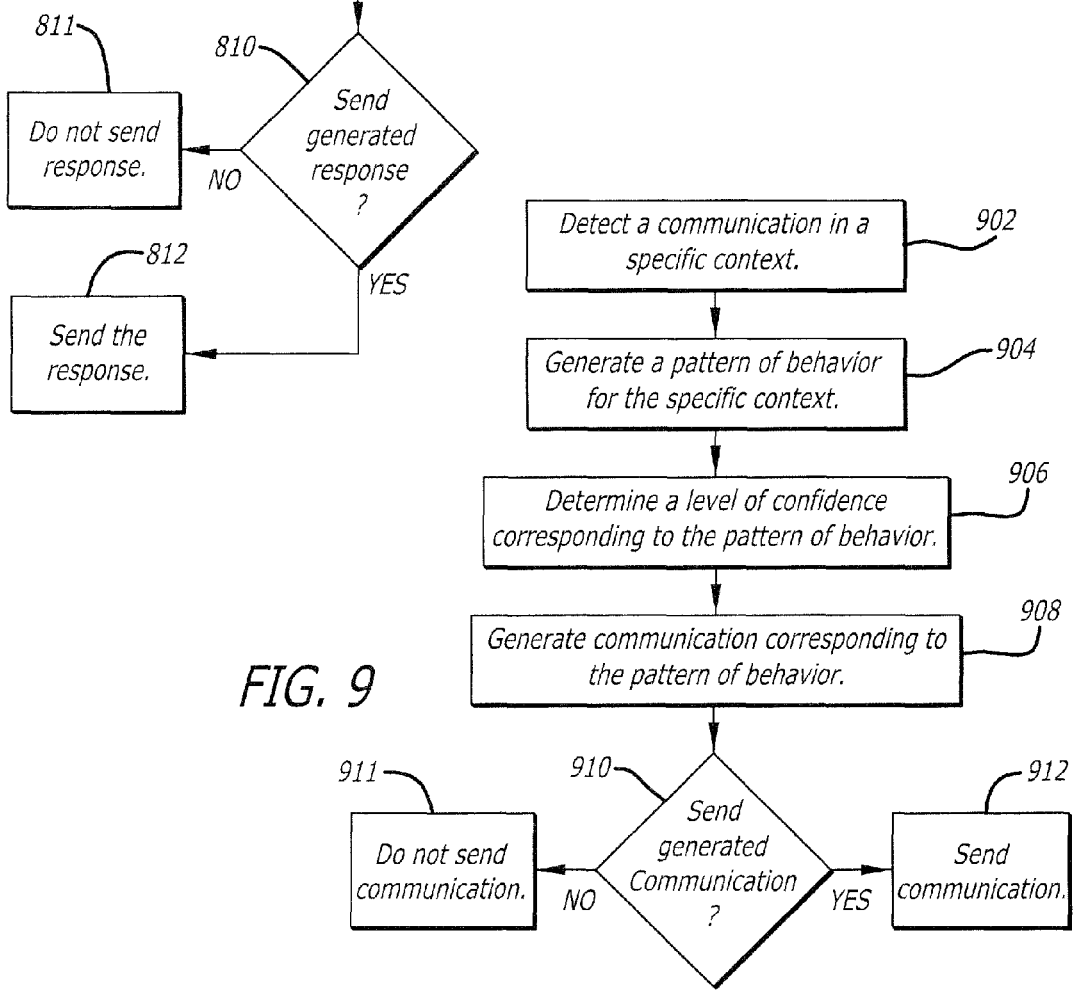
FIG. 9 illustrates another example process for generating a communication in accordance with at least one embodiment.

FIG. 9 illustrates an example process 900 for automatically generating a communication based on patterns of behavior, in accordance with various embodiments. As discussed above, it should be understood that, for any process discussed herein, there can be additional, fewer, or alternative steps performed in similar or alternative orders, or in parallel, within the scope of the various embodiments unless otherwise stated. In this example, a communication in a specific context is detected 902. A pattern of behavior for the specific context is generated 904 in response to detecting multiple occurrences of the communication in the specific context. To detect multiple occurrences of a communication in a specific context, communication information is monitored by mining textual information, such as a user's emails, social network feeds, text messages, and by using voice data by analyzing the content of a user's conversations as described above. The context information can be monitored by taking various motion and positioning sensor data into account along with a time of day, day of the week or by mining data from various applications, such as a calendar application, email, task lists, and the like. This information, for example, may be cached locally in a cache memory, stored remotely, or locally stored information can be blended with server updates. In this example, a level of confidence corresponding to the pattern of behavior is determined 906. Referring to the example of FIG. 6, the level of confidence for the pattern of behavior of the user texting his wife upon leaving work would be considered high given the fact that, in that example, the user texts her almost every day under those circumstances. This and other consistent or habitual communication behaviors would be considered high relative to infrequent communications. If the level of confidence at least meets a predetermined value, the user is prompted to provide an input 908. If the user does not want to send the communication, the communication is deleted 909 or the user provides the input, which can be a voice input provided to a conversational interface or a touch input provided to a touch display screen of the computing device, for example, to send the communication 910.

In addition, various embodiments utilize a conversational interface for a computing device. A conversational interface can include an automated assistant to facilitate user interaction with the device and to assist the user with local and/or remote services. In various embodiments, the automated assistant engages with the user in a conversational manner using natural language dialog to obtain information or perform various actions. The automated assistant could call services that interface with functionality and applications on the computing device to perform functions and operations that may otherwise be initiated using a conventional user interface.

Figures 10A, 10B:
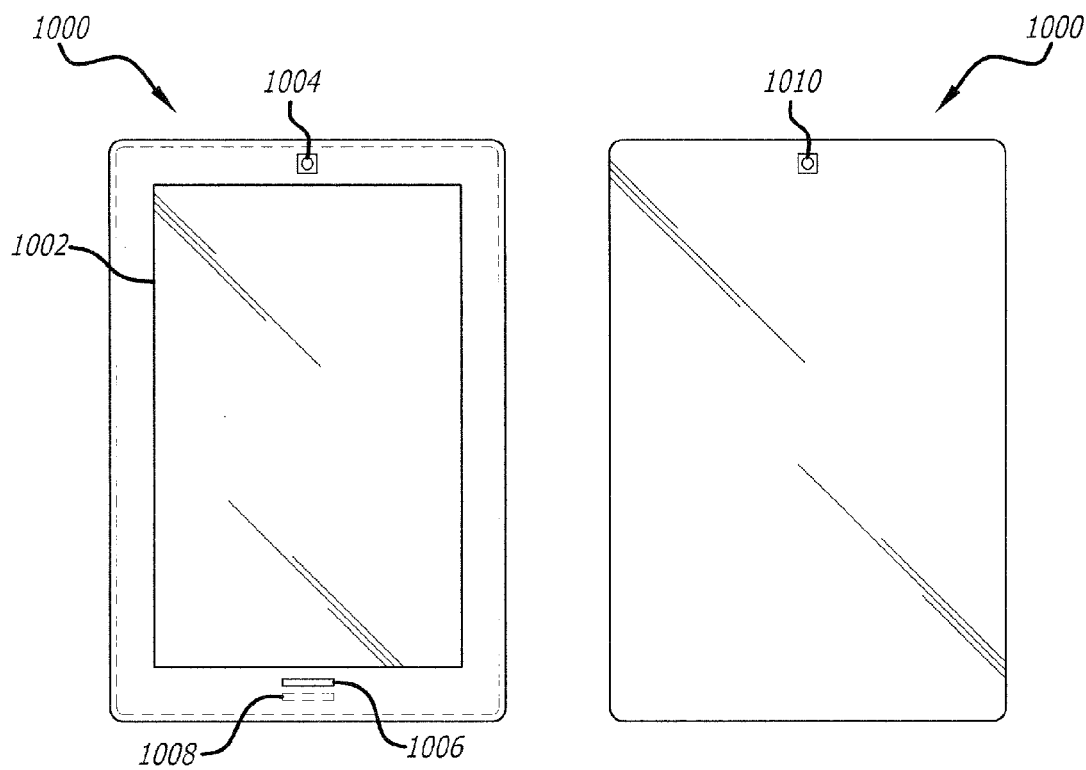
FIGS. 10A and 10B illustrate front and back views of an example computing device that can be used in accordance with various embodiments.

FIGS. 10A and 10B illustrate front and back view respectively of an example computing device 1000 that can be used in accordance with various embodiments. Although one type of computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and media players, among others.

In this example, the computing device 1000 has a display screen 1002 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 1010 on other areas of the device as well, such as on the sides or back of the device. While in at least some embodiments a user can provide input by touching or squeezing such a material, in other embodiments the material can be used to detect motion of the device through movement of a patterned surface with respect to the material.

The example computing device can include one or more image capture elements for purposes such as conventional image and/or video capture. As discussed elsewhere herein, the image capture elements can also be used for purposes such as to determine motion and receive gesture input. While the computing device in this example includes one image capture element 1004 on the "front" of the device and one image capture element 1012 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The computing device can also include at least one microphone 1006 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 1000 in this example also includes at least one motion- or position-determining element 1008 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 1014, such as may include at least one wired or wireless component operable to communicate with one or more computing devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

Figure 11:
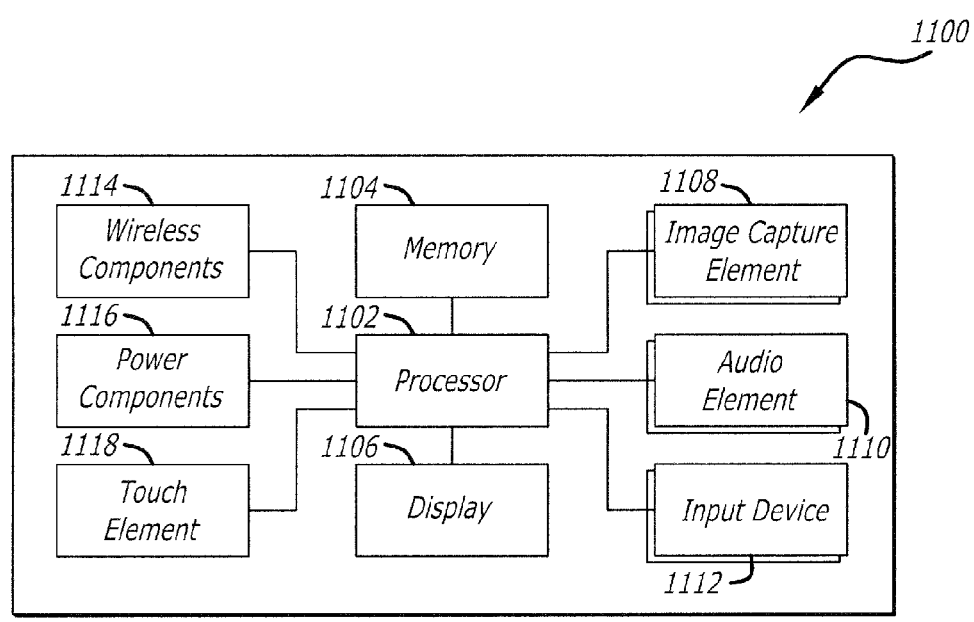
FIG. 11 illustrates example components of an computing device that can be used in accordance with various embodiments.

In order to provide functionality such as that described with respect to FIGS. 10A and 10B, FIG. 11 illustrates an example set of basic components of a computing device 900, such as the device 1000 described with respect to FIGS. 10A and 10B. In this example, the device includes at least one processor 1102 for executing instructions that can be stored in at least one memory device or element 1104. As would be apparent to one of ordinary skill in the art, the device can include many types of memory, data storage or computer-readable storage media, such as a first data storage for program instructions for execution by the processor 1102, the same or separate storage can be used for images or data, a removable storage memory can be available for sharing information with other devices, etc.

The device typically will include some type of display element 1106, such as a touch screen, electronic ink (e-ink), organic light emitting diode (OLED) or liquid crystal display (LCD), although devices such as media players might convey information via other means, such as through audio speakers. As discussed, the device in many embodiments will include at least one image capture element 1108, such as one or more cameras that are able to image a user, people, or objects in the vicinity of the device. In at least some embodiments, the device can use the image information to determine gestures or motions of the user, which will enable the user to provide input through the device without having to actually contact and/or move the device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 1110, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device.

The device can include at least one additional input device 1112 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 1114 operable to communicate with one or more computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 1116 known in the art for providing power to a computing device, which can include capacitive charging elements for use with a power pad or similar device as discussed elsewhere herein. The example device also can include at least one touch- and/or pressure-sensitive element 1118, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes. Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. For example, the computing device could stop receiving geographic location data when the battery drops below a predetermined power level or charge threshold. The predetermined level could be, for example, below 25% full, depending on battery capacity, efficiency, and the like, but could be higher or lower in various embodiments. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 12:
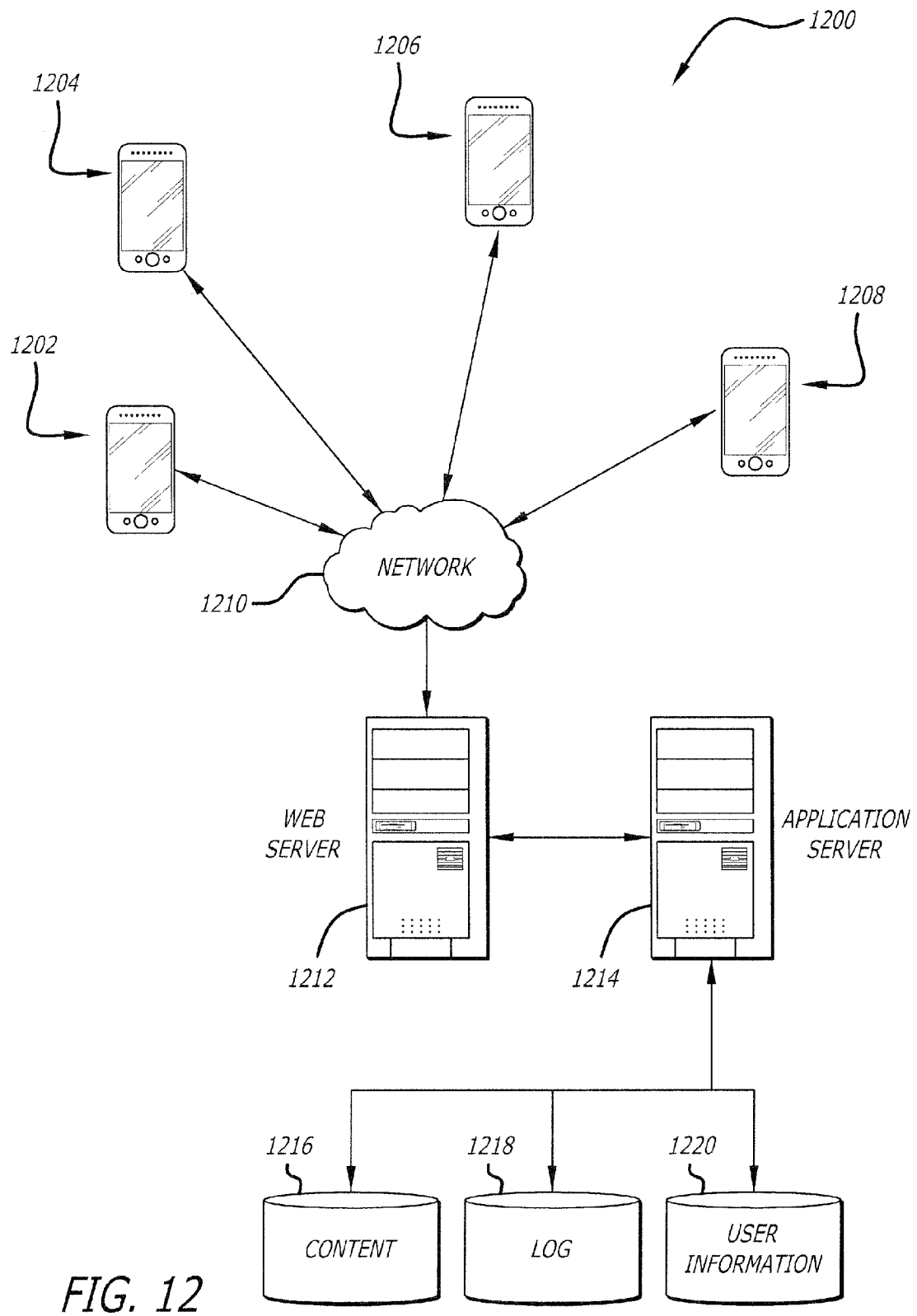
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes electronic client devices (1202, 1204, 1206, 1208) which can include any appropriate device operable to send and receive requests, messages or information over an appropriate network 1210 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1212 for receiving requests and serving content in response thereto, although for other networks, an alternative device serving a similar purpose could be used, as would be apparent to one of ordinary skill in the art.

The illustrative environment includes at least one application server 1214 and a data store 1216. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1214 can include any appropriate hardware and software for integrating with the data store 1216 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1212 in the form of HTML, XML or another appropriate structured language in this example. The handling of all requests and responses, as well as the delivery of content between the client devices (1202, 1204, 1206, 1208) and the application server 1214, can be handled by the Web server 1212. It should be understood that the Web and application servers are not required and are merely example components, as structured code discussed herein can be executed on any appropriate device or host machine as discussed elsewhere herein.

The data store 1216 can include several separate data tables, databases or other data storage mechanisms and media for storing data relating to a particular aspect. For example, the data store illustrated includes mechanisms for storing content (e.g., production data) 1218 and user information 1222, which can be used to serve content for the production side. The data store is also shown to include a mechanism for storing log or session data 1220. It should be understood that there can be many other aspects that may need to be stored in the data store, such as page image information and access rights information, which can be stored in any of the above listed mechanisms as appropriate or in additional mechanisms in the data store 1216. The data store 1216 is operable, through logic associated therewith, to receive instructions from the application server 1214 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user devices (1202, 1204, 1206, 1208). Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

What is claimed is:

1. A system, comprising:
   at least one device processor; and
   memory including instructions that, when executed by the at least one device processor, cause the system to:
   receive a first communication between a first user and a second user;
   analyze text contained in the first communication to identify at least one communication pattern;
   generate a communication model, to be associated with at least one of the first user and the second user, based at least in part on the at least one communication pattern;
   receive a second communication from the second user, the second communication requesting a response from the first user;
   obtain activity information associated with the first user; and
   in response to the first user not responding to the second communication within a predetermined period of time, generate a message to be sent to the second user, the message including textual content based at least in part on the activity information and corresponding to the communication model.

2. The system of claim 1, further comprising:
   enable the first user to approve the message, and
   send the message to the second user.

3. The system of claim 1, wherein the first communication comprises at least one of an email message, a message in a social network feed, a text message, an instant message, a chat session, or voice data.

4. The system of claim 1, wherein the activity information is associated with at least one of a calendar, a time of day, a location of the first user, or historical behavior data of the first user.

5. A computer-implemented method, comprising
   under control of one or more computer systems configured with executable instructions,
   receiving one or more communications between a first user and one or more other users;
   analyzing text contained in the one or more communications to identify at least one communication pattern;
   generating a communication model, the communication model based at least in part on the at least one communication pattern;
   receiving an incoming communication from a second user, the incoming communication requesting a response from the first user;
   obtaining activity information associated with the first user; and
   generating a message to be sent to the second user, the message including textual content based at least in part on the activity information and corresponding to the communication model.

6. The method of claim 5, wherein generating the message to be sent to the second user is based at least in part on a type of relationship between the first user and the second user.

7. The method of claim 5, further comprising:
   calculating a level of confidence for the first user to respond to the second user, the level of confidence based at least in part on historical behavior data of the first user.

8. The method of claim 7, wherein the level of confidence is further based at least in part on analyzing text contained in the incoming communication.

9. The method of claim 7, wherein the level of confidence is further based at least in part on a type of relationship between the first user and the second user.

10. The method of claim 5, wherein the incoming communication comprises one of a phone call, a video call, a text message, an email, a social network feed or voice data.

11. The method of claim 5, wherein the message further includes textual content based at least in part on the incoming communication.

12. The method of claim 5, wherein the message includes a cancellation to respond to the incoming communication.

13. The method of claim 5, further comprising:
   generating a second message; and
   enabling the first user to select at least one of the message or the second message.

14. The method of claim 5, further comprising:
determining a type of relationship between the first user and the second user using at least one of text contained previous communications between the first user and the second user or a label associated with the second user.

15. The method of claim 5, wherein the one or more communications includes at least one of email messages, social network feeds, text messages, instant messages, chat sessions, or voice data.

16. The method of claim 5, wherein the activity information is associated with at least one of a calendar, a time of day, a location of the first user, or historical behavior data of the first user.

17. A non-transitory computer readable storage medium storing one or more sequences of instructions executable by one or more processors to perform a set of operations comprising:
receiving one or more communications between a first user and one or more other users;
analyzing text contained in the one or more communications to identify at least one communication pattern;
generating a communication model, the communication model based at least in part on the at least one communication pattern;
receiving an incoming communication from a second user, the incoming communication requesting a response from the first user;
obtaining activity information associated with the first user;
generating one or more messages to be sent to the second user, at least one of the one or more messages including textual content based at least in part on the activity information and corresponding to the communication model; and
enabling the first user to select a message from the one or more messages.

18. The non-transitory computer readable storage medium of claim 17, further comprising instructions executed by the one or more processors to perform the operations of:
calculating a level of confidence for the first user to respond to the second user, the level of confidence based at least in part on at least one of historical behavior data of the first user or text contained in the incoming communication.

19. The non-transitory computer readable storage medium of claim 17, further comprising instructions executed by the one or more processors to perform the operations of:
determining a type of relationship between the first user and the second user using at least one of text contained in previous communications between the first user and the second user or a label associated with the second user.

20. The non-transitory computer readable storage medium of claim 17, wherein the textual content is further based at least in part on text contained in the incoming communication.

* * * * *